Feb. 7, 1928.

T. D. CAMPBELL 1,658,775

METHOD AND APPARATUS FOR DRYING GRAIN AS THRASHED

Filed April 9, 1927  2 Sheets-Sheet 2

Inventor:
Thomas D. Campbell
John M. Mason
Atty.

Patented Feb. 7, 1928.

1,658,775

UNITED STATES PATENT OFFICE.

THOMAS D. CAMPBELL, OF HARDIN, MONTANA.

METHOD AND APPARATUS FOR DRYING GRAIN AS THRASHED.

Application filed April 9, 1927. Serial No. 182,318.

This invention relates to a method and apparatus for drying grain and an object of the invention is to provide a means whereby the grain is dried as thrashed.

Another object of the invention is to provide a combined thrasher and grain drier.

Another object of the invention is to provide a method of drying grain whereby losses in grades of the grain owing to the rains or snows occurring after the grain is cut can be eliminated and the grain made safe for storage.

Another object of the invention is to provide a drier for drying grain which can readily be attached to a thrashing machine, corn huller, a combined harvester and thrasher, or any other type of grain separating machine.

Another object of the invention is to provide a grain drier which operates to dry the grain and such weeds or other foreign matter which has passed through the thrasher with the grain and has not been separated therefrom whereby the weeds and foreign matter can be easily separated from the grain by means of an air blast provided forming a part of this invention.

Another object of the invention is to provide a grain drier which can be attached to old or new thrashers or combined harvesters and thrashers and which can be used for drying any kind of small grain or cereal crops.

Another object of the invention is to provide a device which is practical and efficient in operation, easy to install and costs a minimum to manufacture.

Another object of the invention is to provide a drier for drying all kinds of grain such as wheat, oats, rye, barley, flax, corn, peas, beans and other grains.

Another object of the invention is to provide a drier which receives power for its operation and heat from the same source as the thrasher to which it is attached or from the thrasher itself.

Another object of the invention is to provide a drier which receives its heat from the exhaust of an internal combustion engine which operates the grain separator.

Another object of the invention is to provide a grain drier having means for heating the same, and automatically regulated means for controlling the heating of the drier.

Another object of the invention is to provide a grain drier combined with a supplemental separator whereby the grain after passing through the drier is separated from all such dust leaves and other matter which has not been separated from the grain by the thrasher, corn huller, etc., before passing into the drier.

Another object of the invention is to provide a combined grain separator and drier having means for continually turning over the grain whilst in contact with the heated gases in the drier.

Other objects will appear hereinafter throughout the specification.

Figure 1:
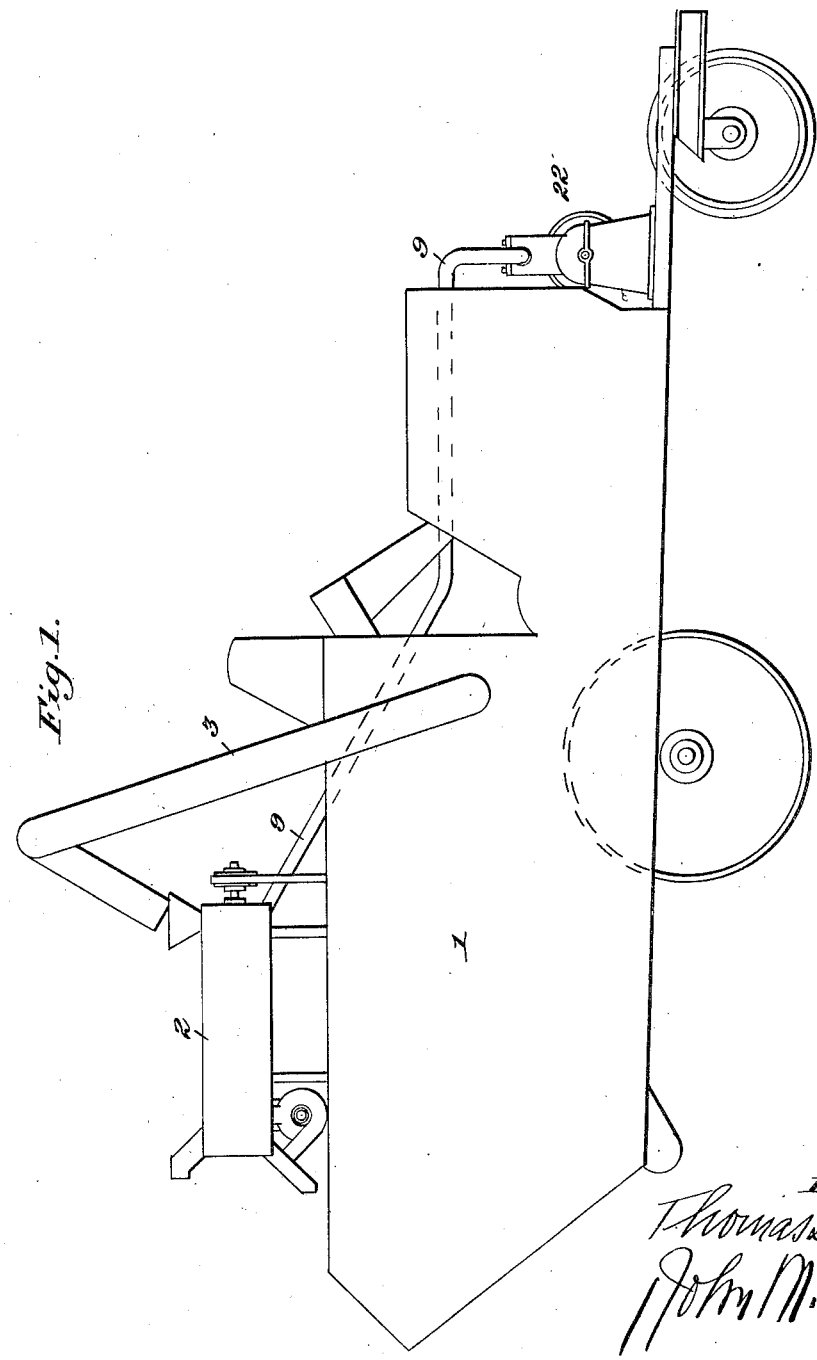
Figure 1 is a side elevation of my invention applied to a thrasher.

Heretofore grain farmers have suffered severe losses in grain by reason of the fact that the grain after being cut was allowed to remain on the field where it became wet from snow, rain, dew or by sweating and was later shipped to storage places in its wet condition. When the season became late farmers were forced to thrash grain whenever they could. This grain after being thrashed was often too damp for storage without first being dried at terminals and the buyer of the grain was forced to offer the farmer a low price in order to overcome the hazards which he took in handling this damp grain.

Possible losses thereon made it necessary to pay the farmer a smaller price than that which would have been paid him if the grain was shipped in a dried condition.

In the drawings there is shown a thrashing machine 1 upon which is mounted a drier 2.

The above construction is shown and described for purposes of illustration only as I wish it to be expressly understood that any means whatsoever may be provided to cut the grain and separate it. For instance the thrasher may be a stationary one or a combined harvester and thrasher and the cut grain in bundles may be hauled to the thrasher by wagons or other conveyances.

Figure 2:
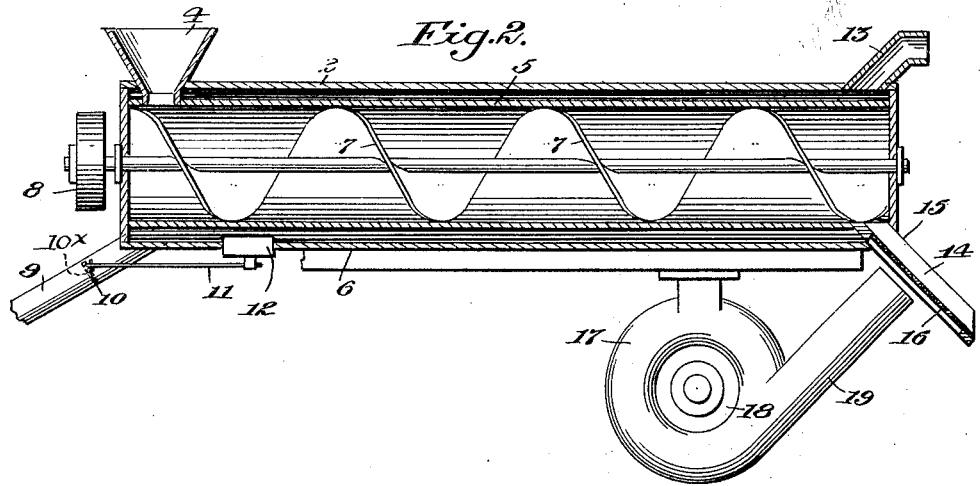
Figure 2 is a vertical sectional view with parts shown in full lines of one form of my improved grain drier.

The word thrasher is used herein to mean any grain separating device.

Where corn is being dried with my invention, all of the apparatus heretofore described can be dispensed with and the hulled corn fed directly by any suitable means into the devices illustrated by Figures 2, 3 and 4 hereinafter to be described, which can be attached to the corn huller.

A conveyor 3 or elevator is provided to conduct the thrashed grain by augers, elevators or other suitable means to the drier 2 mounted preferably on top of the thrasher 1. The drier consists of an inlet 4 which leads into an interior cylinder 5 spaced from an outer cylindrical member 6. Within the inner cylinder 5 is an auger 7 mounted to rotate therein and driven by a pulley 8 which is rotated by a belt not shown, and driven by a power take off from the thrasher or by any suitable means such as, preferably the internal combustion engine 22 which drives the thrasher.

The numeral 9 indicates a pipe leading preferably from the exhaust manifold of said internal combustion engine if one be provided to drive the thrasher 6, or a steam exhaust if steam be provided for driving the thrasher. Other sources of heat may be provided however. Within the pipe 9 is provided a butterfly or other valve member $10^x$ indicated by dotted lines to by-pass the gases to the atmosphere through a suitable opening in said pipe which is actuated by a lever 10. Connected at one end to the lever 10 is a rod 11 having its other end connected to and actuated by a thermostat 12 of any preferred construction located within the outer cylinder 6. The thermostat may be located in any position however where it can be acted upon by the heated gases which are led within the outer cylinder 6 by pipe 9.

The numeral 13 indicates an outlet for the gases which enter from pipe 9. The numeral 14 indicates a chute, the top portion 15 of which is open to the atmosphere. The bottom portion 16 is of open mesh construction. Suitably supported by the drier is a fan blower 17 driven by a pulley 18 from a belt not shown which is connected to a power take off from the thrasher or to the power means which drives the thrasher. Fan 17 forces a blast of air up the pipe 19 and through the screen 16.

The grain in damp condition enters the drier 2 and falls into the interior of inner cylinder 5 where it is continuously turned over and agitated by the auger 7 and conveyed towards the chute 14. The inner cylinder is heated by the hot gases entering through pipe 9. The temperature of the grain is maintained constant by means of the thermostat 12 which regulates the valve in pipe 9 in order that a safe and proper temperature is always maintained in the cylinder or chamber 5. The grain after passing through the chamber 5 is forced out on the trough or delivery spout 14 and cleaned by the fan 17, so placed in the delivery spout that the blast of air from the same removes from the grain all of the dust, dry weeds, leaves etc. which pass out through the open portion 15. The dried and cleaned grain after passing down the spout 14 is either elevated into grain wagons or delivered into a sack or any other suitable receptacle.

Figure 3:
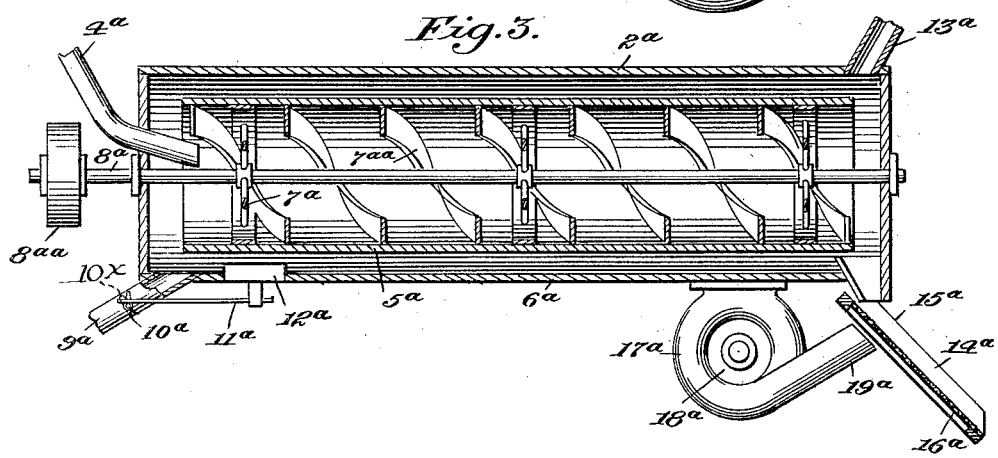
Figure 3 is a vertical sectional view with parts shown in full lines of another form of my improved grain drier.

In Figure 3 is illustrated another form of drier. The damp grain enters the drier $2^a$ at $4^a$ into an inner cylinder or chamber $5^a$ open at both ends and located within an outer chamber or cylinder $6^a$. The inner member $5^a$ is supported for rotation on a shaft $8^a$ by arms $7^a$. The shaft is rotated by a pulley $8^{aa}$ which is driven from a power take off from the thrasher or other source of power such as the motor which drives the thrasher. An intake pipe $9^a$ for heated gases having a valve $10^y$ to by pass the gases to the atmosphere when actuated by a thermostat hereinafter described, connected to lever $10^a$ provides the means for heating the drier as in Figure 2. Lever $10^a$ is connected to one end of a rod whose other end is connected to a thermostat $12^a$ which regulates the heat of the drier by closing or opening the passageway $9^a$ through which the heated gases pass preferably from the exhaust of the internal combustion engine which drives the thrasher.

The numeral $7^{aa}$ indicates an auger which is fastened to the interior of the inner cylinder and turns with it.

The numeral $13^a$ indicates the exhaust for the heated air. The grain is turned over and over whilst being heated by the inner cylinder $5^a$ and to some extent by the heated gases themselves, after which it drops onto the chute $14^a$. Air forced against the screen $16^a$ by means of blower $17^a$ through pipe $19^a$ forces all dust leaves etc. out through the open top $15^a$. Blower $17^a$ is driven by the pulley from any source of power take off on the thrasher or from a power take off from the source of power which operates the thrasher.

Figure 4:
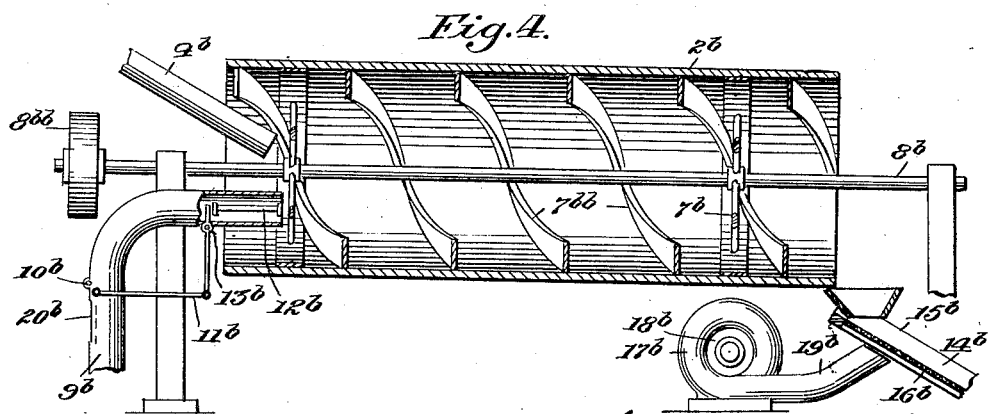
Figure 4 is a vertical sectional view with parts shown in full lines of still another form of my improved grain drier.

I have illustrated still another type of driver in Figure 4 wherein the heated gases are at all times in direct contact with the grain as it passes through the drier.

In this form only one drum or cylinder $2^b$ is provided which is entirely open at both ends to the atmosphere. A pipe $4^b$ conducts the damp thrashed grain from the thrasher by means of an auger or other elevating means to the drier $2^b$. The drier is supported by arms $7^b$ on a rotating shaft $8^b$ which is driven by pulley $8^{bb}$. The pulley is rotated by a suitable power take off from the thrasher or motor which drives the same. The numeral $7^{bb}$ indicates an auger which forces the grain through the drier to the chute $14^b$ where it is separated from any dust, leaves etc. which have not previously been separated therefrom by the thrasher. The drier indicated in Figure 4 is preferably mounted on top of the thrasher and is supported by standards thereon.

The blower 17$^b$ is driven by pulley 18$^b$ which is rotated by a power take off from the thrasher or the motive means which drives the same. Air is forced by the blower up the pipe 19$^b$ and through the screen 16$^b$, forcing through the upper portion of the chute 15$^b$ the leaves etc. and allowing the dried and cleaned grain to pass down the chute and into bags or other receptacles provided for the purpose.

Heated gases from the exhaust of the engine which drives the thrasher enters the drier through pipe 9$^b$. Located in this pipe is a valve member indicated in dotted lines and pivoted at 10$^b$. The means for actuating the valve consists of a rod 11$^b$ fastened at one end to the valve and pivoted near the other end at 13$^b$. A thermostat 12$^b$ actuates the rod on the other side of the pivot 13$^b$.

The pipe 9$^b$ has a cut out portion 20$^b$ which is closed by the valve in the position indicated by dotted lines in Figure 4. In this position the heated gases pass up through the pipe 9$^b$ to the drier. If the interior of the drum becomes too hot the thermostat moves the valve to an intermediate or closed position and part or all of the heated gases are passed out through the cut out portion of the pipe 20$^b$ to the atmosphere.

I do not desire to be limited to the construction shown by the drawings and set forth in the specification but only as set forth by the appended claims:

1. In a method of treating grain consisting of separating the grain as it comes from the field and prior to storage and continuously forcing the separated grain as it comes from the separator into a drier, turning the grain whilst subjecting it to the drying action of the drier, and cleaning the dried grain.

2. A grain separator having means for driving the same, a drier mounted on said grain separator having means for feeding the separated grain to the drier, heating means for said drier furnished by the exhaust from said separator driving means and means for automatically regulating the heat of said drier.

3. A grain separator having means for driving the same, a drier mounted on said grain separator having means for feeding the separated grain to the drier, heating means for said drier furnished by the exhaust from said driving means and means for automatically regulating the heat of said drier, and means for cleaning continuously the dried grain as it comes from the drier.

4. A grain separator having means for elevating the separated grain, a drier mounted on the separator, means for rotating parts of said drier, said elevating means having means for delivering the grain to said drier, a heater for said drier, means for regulating the heat of said heating means and means for cleaning the grain as it is fed from the drier.

5. A grain separator having a drier mounted thereon and means whereby the separated grain from said separator is continuously delivered to said drier, said drier having an inlet at one end for grain, and an inlet at said end for a heating medium, and an exhaust at the other end for said heating medium and an exit at said other end for said grain, and grain cleaning means attached to said other end and means for continuously delivering grain from said drier to said cleaning means, whereby the grain is cleaned as it comes from said drier and a thermostat for controlling the amount of heating medium admitted to said drier.

6. A grain separator having a power take off thereon, a drier mounted on said separator and operated by said power take off and an elevating conveyor for continuously feeding grain from said separator to said drier and means continuously operated by said separator for continuously cleaning the dried grain.

7. A grain separator, an internal combustion motor for operating the same, a drier attached to said grain separator an exhaust for said motor and means for conveying the exhaust from said motor to said drier whereby the grain is dried, and means for automatically regulating the amount of gases conveyed from said motor to said drier.

8. A grain separator, an internal combustion motor for operating the same, a drier attached to said grain separator an exhaust for said motor and means for conveying the exhaust from said motor to said drier whereby the grain is dried and means for automatically regulating the amount of gases conveyed from said motor to said drier, and a grain cleaner attached to said drier.

9. A drier, a separator having a conveyor therefrom to said drier, an internal combustion engine for driving said drier and separator means for conducting exhaust gases from said engine to said drier, and a grain cleaner located at one end of the drier.

10. In combination, a separator, a drier, an internal combustion engine, means for driving said drier and separator from said internal combustion engine, a conduit for exhaust gases leading from said engine to said drier, a pipe leading from said separator to said drier for conducting separated grain to said drier and means located in said exhaust conduit for regulating the amount of heated gases admitted from said exhaust conduit to said drier.

11. In combination, a separator, a drier, an internal combustion engine, means for driving said drier and separator from said internal combustion engine, a conduit for exhaust gases leading from said engine to said drier, conduit means for conducting grain from said separator to said drier, and a valve in said exhaust conduit for regulating the amount of exhaust gases led to said drier.

12. The method of thrashing, drying and cleaning grain which consists in thrashing the grain from the straw, separating the grain from the straw, discharging the separated grain with the unseparated damp weeds and other foreign matter, drying the grain, weeds and foreign matter thus discharged and finally separating the dried grain from the dried weeds and foreign matter in a continuous operation.

13. The method of thrashing, drying and cleaning grain which consist in thrashing the grain from the straw, separating the grain from the straw, discharging the separated grain with the unseparated damp weeds and other foreign matter, drying the grain, weeds and foreign matter thus discharged, regulating the temperature to which the grain, damp weeds and foreign matter are subjected during the drying operation, and finally separating the dried grain from the weeds and foreign material thus dried in a continuous operation.

14. The method of thrashing, drying and cleaning grain which consists in thrashing the grain from the straw, separating the grain from the straw, discharging the separated grain with the unseparated weeds and other foreign material, drying the grain, weeds and foreign material thus discharged and finally separating the dried grain from the weeds and foreign material by a blast of air in a continuous operation.

15. The method of successively thrashing, separating and drying grain which consists in thrashing the grain from the straw, and separating the grain from the straw under normal atmospheric temperatures, discharging the separated grain with the unseparated damp weeds and foreign matter, and subjecting the grain, damp weeds and foreign matter thus discharged to a regulated high temperature range, outside of the thrashing and separating zone while maintaining the material treated in the thrashing and separating zone at substantially normal atmospheric temperatures.

THOMAS D. CAMPBELL.